United States Patent
Westen et al.

(10) Patent No.: US 10,032,325 B1
(45) Date of Patent: Jul. 24, 2018

(54) FORMATTED CARD SIGNATURE GENERATOR

(71) Applicant: SQUARE, INC., San Francisco, CA (US)

(72) Inventors: Peter Westen, San Francisco, CA (US); Robert Andersen, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/382,132

(22) Filed: Dec. 16, 2016

(51) Int. Cl.
*G06F 17/00* (2006.01)
*G07C 9/00* (2006.01)
*G06F 3/0488* (2013.01)
*G06T 3/40* (2006.01)

(52) U.S. Cl.
CPC ..... *G07C 9/00087* (2013.01); *G06F 3/04883* (2013.01); *G06T 3/40* (2013.01); *G07C 2009/00095* (2013.01)

(58) Field of Classification Search
USPC ............................................ 235/382; 705/21
See application file for complete search history.

(56) References Cited

U.S. PATENT DOCUMENTS

| | | | |
|---|---|---|---|
| 8,700,905 B2 * | 4/2014 | Guenther | G06F 21/32 713/179 |
| 2014/0249947 A1 * | 9/2014 | Hicks | G06Q 10/087 705/21 |
| 2017/0154341 A1 * | 6/2017 | Gilbertson | G06Q 30/018 |

\* cited by examiner

*Primary Examiner* — Allyson Trail (74) *Attorney, Agent, or Firm* — Baker Botts L.L.P.

(57) ABSTRACT

Disclosed herein are systems and methods for generating a signature on a card. The computer may present a user interface on a touch device having a bounding box that is specified by a width and height representative of a space on the card. The computer may receive signature data generated by an input stroke on the touch device. The computer may determine from the signature data coordinates of a signature represented by the input stroke. The computer may generate a set of points representing a curvature of the input stroke. The computer may scale the set of points such that the coordinates are maximized within the space. The computer may convert the scaled set of points from a vector format to a raster format. The raster formatted scaled set of points in the space may be imprinted on the card.

23 Claims, 10 Drawing Sheets

FORMATTED CARD SIGNATURE GENERATOR

BACKGROUND

People have used signatures for identification as well as authority for many years. A party can finalize a contract by signing the contract, sometimes in the presence of another party. Payment cards may require signatures to verify that the payment card holder can replicate the signature later, for security purposes. When the payment card holder receives a new card in the mail, the payment card holder signs the payment card. Once the payment card is signed, the signature cannot be erased, and the payment card cannot be re-signed. As a result, some signatures may appear to be skewed, too big, or too small for the given signature box area. For a conventional payment card, the payment card holders have no opportunity to preview a signature before it is printed on the card. Similarly, users' signatures on their drivers licenses tend to be printed with low quality and may experience anti-aliasing due to digital formats. These users do not have an option to sign with high fidelity printing on their drivers licenses. Presently, no systems automatically rescale and resize signatures before printing them for users on their cards, so quality and appearance of signatures is often undesirable.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the present disclosure.

DESCRIPTION

A signature using a finger on a touch screen of a mobile device is often imprecise, so a card printed with that signature is also imprecise. The signature may be blurred or bleed as the mobile device attempts to generate precise lines and curves. For example, when a user sign's her name in cursive on a touch screen, curves of that signature may overlap. Some letters, such as an upper case "J" or a lower case "e" have overlapping lines within the letter, which may cause blurring in the regions of the overlapped lines. The stroke width may also vary across the signature, making the signature even harder to read. Most conventional mobile device applications do not correct curvature information of a signature. As a result, signatures are often blurred or pixelated in digital applications and can differ greatly from a signature using a pen on paper.

Additionally, when a user signs a payment card, the signature may be skewed on the payment card. For example, the user's signature may be angled to the left and may not extend across the entire signature box, only using a portion of the signature box allocated on the payment card. Also, the user's signature may be partially outside of the signature box. So it is desirable to have a software application that presents the user with a space to sign a payment card, adjusts the signature, and then prints the signature on the payment card. The embodiments disclosed herein enable a user to sign a payment card using a touch screen of a mobile device executing a software application, and the software application can present a formatted, clean and properly-scaled signature for printing on the payment card.

In some embodiments, a mobile device's application is programmed to present a user with a dotted bounding box for signing, which is preformatted to an aspect ratio for the signature space on a payment card. The mobile device may gather touch sensitive input data from a user's finger, stylus, or other input device. The mobile device may receive input information (e.g., capacitive changes on a touch screen device from a finger or stylus, or infrared data from mouse movements), and the application may receive this input information from the mobile device, which may include raw data or pixel-based data. The application may generate a series of points associated with the received data.

Raw input data, however, may include noise. Therefore, embodiments may reduce the noise by limiting the use of the raw data, e.g., by using every third point as a data point on the signature curve. The intervening points may be used as control points (non-data) for a Bezier curve, for example. Using fewer points may help in reducing the noise and providing a smoother curve. The mobile device may identify the leftmost, rightmost, highest and lowest points to see how much to scale the curve. The mobile device may then scale the set of points so that the signature is maximized within the signature box or space on the card.

In some embodiments, the mobile device may convert the scaled points and curve information into a raster format. In converting to a raster format, the mobile device may add a stroke width that is consistent throughout the signature. Scaling the stroke width with the vector data enables a higher fidelity image with greater clarity. When the mobile device converts the scaled points to an image, the application may display the rendered image to the user on the touch screen of the mobile device. The user may be able to preview the signature to reject or confirm the captured and adjusted signature before the application transmits that signature for printing.

The mobile device may be in communication with a data server. For example, the server may be used to store some of the curvature data. The server may also provide the mobile device with an appropriate aspect ratio for the card signature block. When the rendered image is finalized, the image is transmitted for printing on the payment card. A manufacturer or printer may receive the signature rasterized image and profile information for the user. The manufacturer may print or laser etch the signature into the preformatted signature block onto the payment card and ship the payment card to the user. As such, examples described herein offer numerous technical advantages over previous methods for formatting personalized digital signatures printed or etched on payment and other types of cards.

In another embodiment, a user may use a signature input device (e.g., a signature pad or tablet) communicatively coupled to a laptop or computer. The user may access an application executed by the computer that presents a bounding box on a monitor of the computer. In one embodiment, the signature input device may have a bounding box on the interface for guidance. The user can sign using a stylus, finger, mouse, or other input mechanism on the signature input device. The user's signature may extend beyond the boundaries of the bounding box. When the user signs outside the bounding box, the signature will be reformatted to fit inside the preformatted signature box or space on a card.

The computer may generate a set of points based on the data received from the signature input device, e.g., via a stylus. For example, the signature input device may have pressure sensitive sensors and store pressure points mapped using X and Y coordinates. The points transmitted by the signature input device may be stored as raw data and mapped to the nearest pixel on a grid. Then, the mapped points may be smoothed for a more accurate rendering of the stroke. In one embodiment, the computer may generate Bezier curves representing the curvature of the stroke. The computer may reduce or eliminate noise from the signature curve by using certain points (e.g., every other point) as a control point in the Bezier curve.

The computer or mobile device may scale the points and curvature information to be maximized within a signature block on the card. The computer or mobile device may send the scaled points to a server that may render a rasterized image of the scaled points. The server can transmit the rendered image to a manufacturer who prints the signature on a payment card for the user.

The present disclosure is described in detail with references to embodiments illustrated in the drawings. Other embodiments may be used or other changes may be made without departing from the spirit or scope of the present disclosure. The illustrative embodiments described in the detailed description are not meant to be limiting of the subject matter presented here. Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments may include many other obvious features not described in detail herein. Additionally, some well-known structures or functions may not be shown or described in detail below, to avoid unnecessarily obscuring the relevant description.

Figure 1:
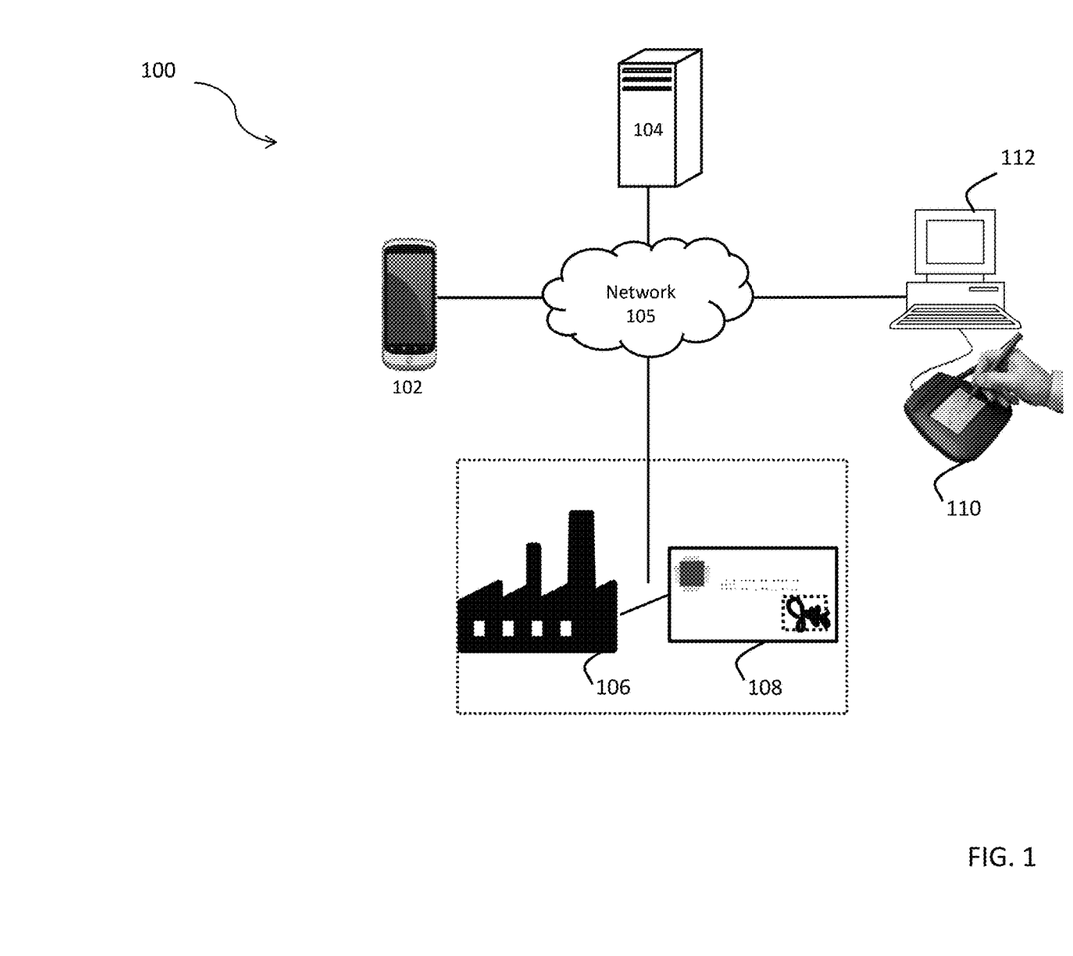
FIG. 1 illustrates a system for generating a formatted card signature, according to an embodiment.

FIG. 1 illustrates a system 100 for generating a formatted card signature. The system 100 may include mobile device 102 that communicates signature data to a server 104 via network 105. The server 104 communicates with a manufacturing facility 106, who may generate payment cards using the inputted signature. Although the embodiments recite a payment card, the card can be a gift card, a rewards card, a driver's license, or any card that may contain a signature.

Mobile device 102 may be a cell phone, tablet computer, laptop computer, smart watch, gaming console, or other computing device. Mobile device 102 may include a touch-screen that receives inputs from a finger, stylus, or other input device, thereby allowing a user to sign on the touchscreen of the mobile device. An application stored on the mobile device and executed by a processor of the mobile device presents a graphical user interface on the touch screen, where the graphical user interface presents a bounding box as guidance for input of a signature.

In another embodiment, a computer 112 can receive an input of a signature on a signature input device 110 (e.g., a signature pad) via a stylus, finger, mouse, or other input device. The computer 112 can execute the application and transmit the signature data to the server 104 via network 105.

Collectively, the use of a mobile device or a computer having a signature input device may be referred to as a touch device, whereby the touch device is communicatively coupled to the network and can receive an input of a signature on a touch screen via a finger, stylus, or the like.

Network 105 may be any wireless or wired communications network. For example, network 105 may be an Internet Protocol (IP) network, a Local Area Network (LAN), a telecommunications network such as a Global System for Mobile Communications network or a Wide Area Network (WAN).

Server 104 may be used to store application data within server 104 or in one or more associated databases. Server 104 may receive data from the application executed by the mobile device 102, such as vector formatted signature data or raster formatted signature data.

Manufacturing facility 106 may be a printer or a manufacturing facility where payment cards 108 are manufactured and printed. The server 104 sends raster or vector image data to the manufacturing facility 106 to be printed on the payment card 108. The manufacturing facility 106 may laser etch or print the signature on the payment card 108. The software in the manufacturing facility may be in synchronization with software on the server 104 so that a finalized signature is printed or etched with the appropriate dimensions, resolution, and clarity.

Figure 2:
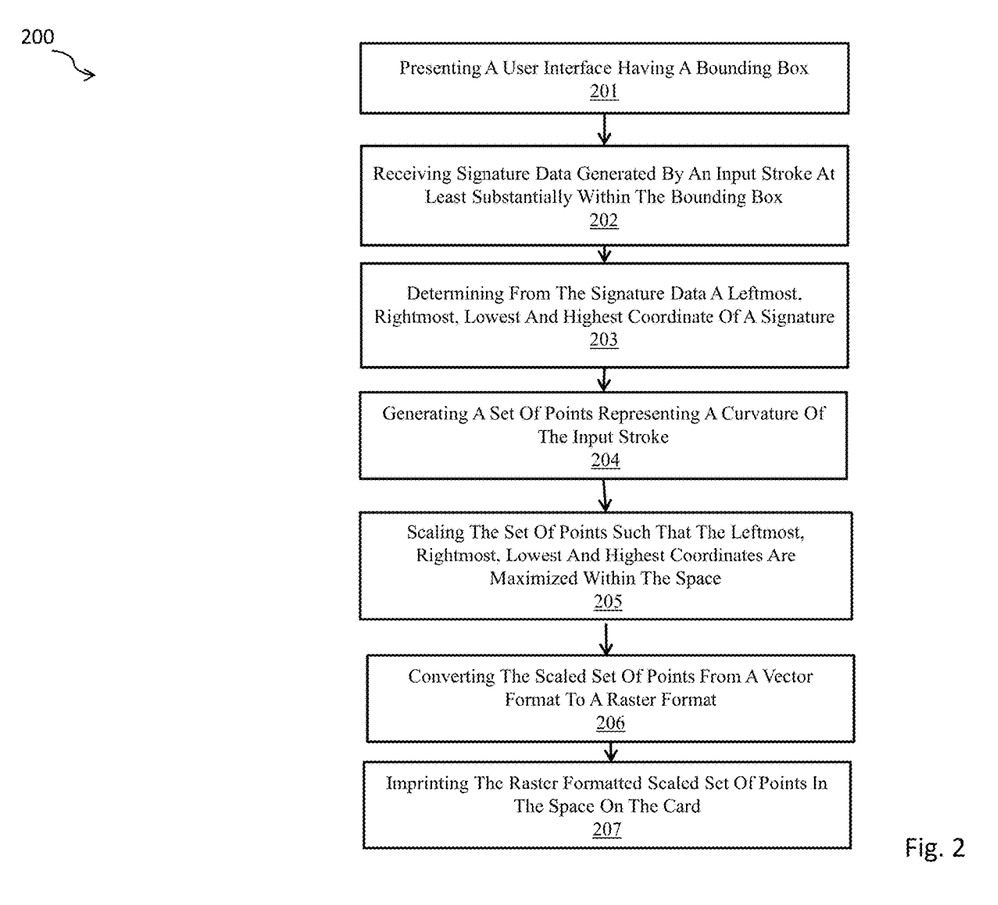
FIG. 2 illustrates a method of generating a formatted card signature, according to an embodiment.

FIG. 2 illustrates a method 200 of generating a formatted card signature, according to an embodiment. In step 201, a touch device presents a user interface having a designated space for the user to sign their signature. In one embodiment, the user interface presents a bounding box that is smaller than the overall bounding, such that the application can capture any portions of the signature that may extend beyond the bounding box. The user interface also presents a message instructing the user to sign within the bounding box. The user may begin to sign in the bounding box.

The server may configure the application on the touch device to use predetermined physical dimensions for the signature box before presenting the bounding box. For example, the server may transmit to the touch device dimensions of 40 mm wide by 12 mm long, which is representative of the signature box on a payment card. The touch device application may scale the 40 mm×12 mm dimensions to an appropriate dimension on the touch screen maintaining the same aspect ratio. The application may then draw a dotted bounding box for the user to sign. The server may also transmit to the mobile device the final stroke width for the signature, whereby any signature of any size will be finalized using the final stroke width. The server may also transmit the inset or location of the signature box on the payment card.

Figure 3:
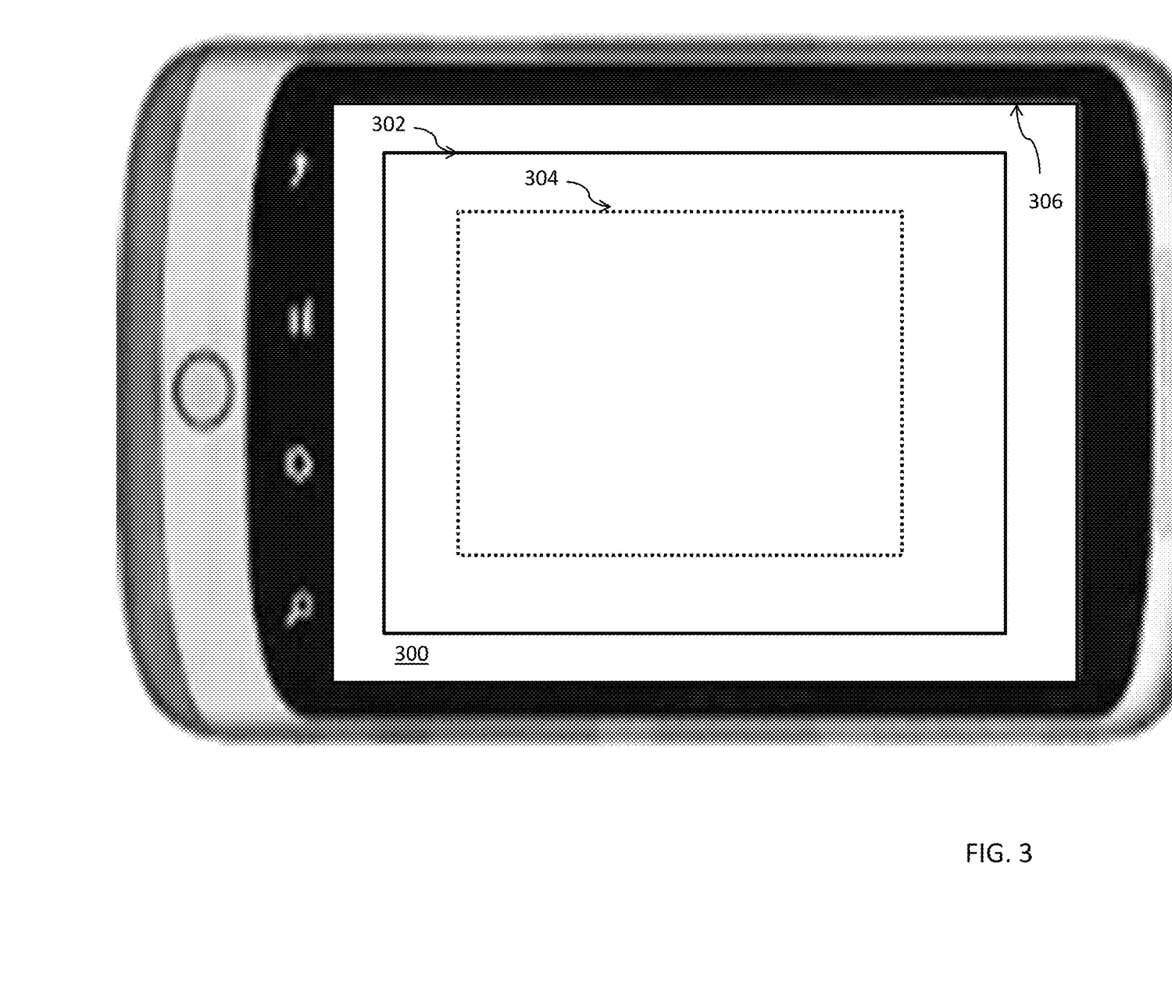
FIG. 3 illustrates a presentation of a user interface, according to an embodiment.

FIG. 3 illustrates a presentation of a user interface 300 that includes application boundary 302, bounding box 304, and screen 306. The touch device may present the user with a graphical user interface 300 that includes pop-up boxes or notifications to indicate to the user where to sign.

The application may enable the user to sign outside of the boundaries of the bounding box 304 and up to the application boundary 302, which is positioned at the edge of the screen. When using the touch device, the user may sign too large, too small, too wide, or too narrow. The bounding box may have the same aspect ratio as the designated signature box on the payment card. In one embodiment, the height and width of the bounding box may have the same proportion of the signature box on the card.

The server may configure the application on the touch device with a predetermined size of the bounding box 304. For example, the server may indicate to the touch device that the signature box on the card will be 45×15 mm in final physical dimensions. The software application on the touch device may use the actual physical dimensions received from the server to determine what size bounding box to present the user.

In step 202, the touch device receives signature data of an input stroke generated when the user inputs a signature on the touch screen. The user's signature may extend beyond the bounding box. Similarly, the user's signature may be smaller than the bounding box. The user's signature may also be skewed to the left or right of the bounding box.

The touch device detects when a finger or stylus is contacting the touch screen, and a capacitive sensor or other sensor generates data representing the interaction. In an example, the user may alter the capacitances at different points on the touch screen as the user moves a finger along the screen. The capacitance may be mapped to different points along a grid and stored in memory. For example, an X and Y coordinate may be assigned to each point. The number of points may be varied. For example, the touch device may change the sampling rate.

The signature data may take any of several forms. For example, the signature data may include raw capacitance changes marked at different X and Y coordinates over time. In another example, a user may use a mouse where the signature data does not use any capacitance changes but may use infrared data. In yet another example, a user may use a stylus or a writing tablet.

Figure 4:
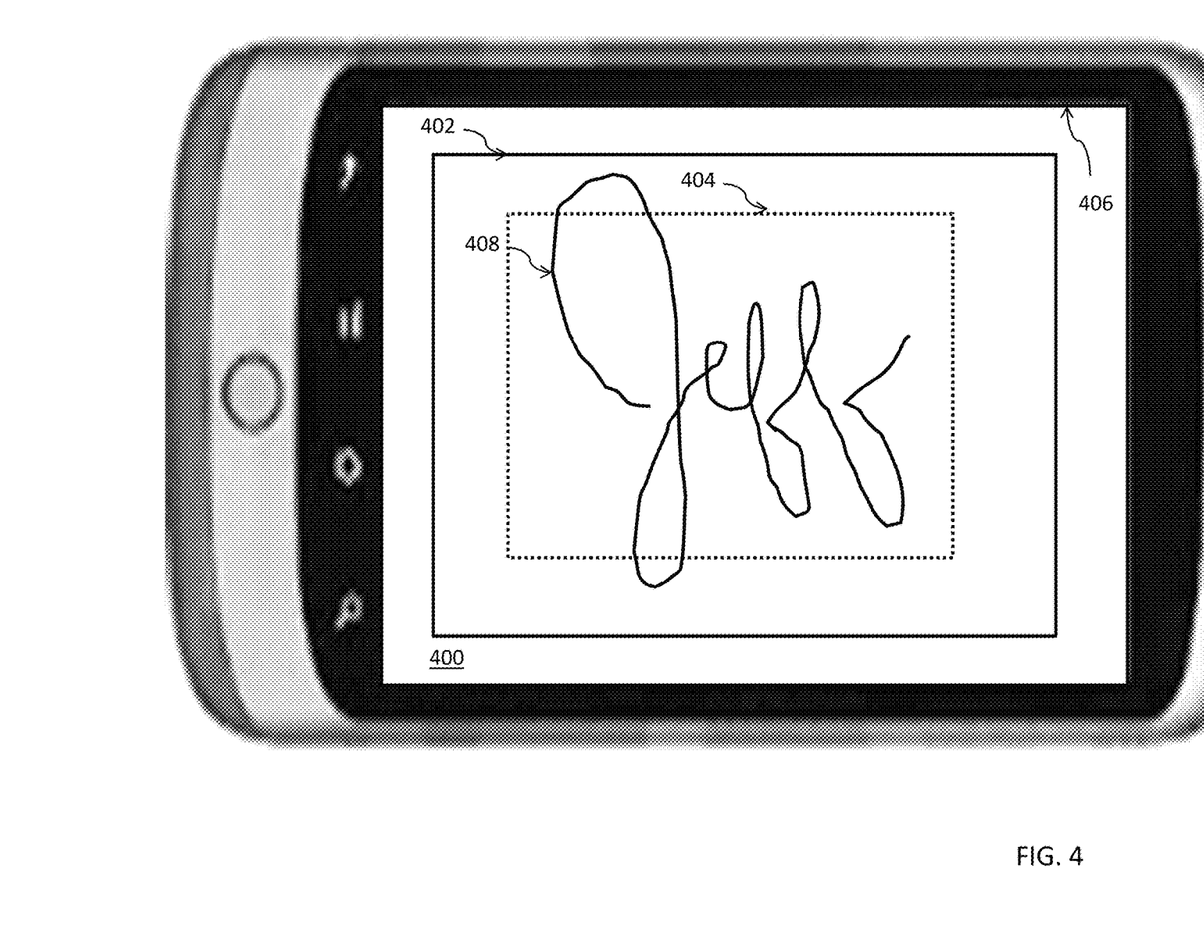
FIG. 4 illustrates a user interface having signature data generated by an input stroke, according to an embodiment.

FIG. 4 illustrates a user interface 400 that received signature data generated by an input stroke 408. The screen 406 displays user interface 400, which includes an application boundary 402, a bounding box 404, and signature 408.

In some instances, the user may sign outside of the bounding box 404, or the user may sign within the bounding box 404 skewed to the left or the right. Regardless of where the user signs, the final signature is normalized to be maximized within the card's signature box. For example, signature 408 may be shortened in the vertical direction and expanded in the horizontal direction to fit bounding box 404.

The touch device or the server may assign a grid of X and Y coordinates to the application boundary 402 and/or screen 406. The user may input a signature, and the touch device may generate signature data upon the movement of the user's finger across the screen. The user may also cause a generation of signature data using a mouse on a computer or a stylus on a tablet or signature input device. The touch device may store the signature data as raw data, including capacitance changes across the grid. The raw data may include time stamps for each of the capacitance changes. The signature data may also be a set of points. The capacitance changes may be mapped to the nearest pixel, for example. The nearest pixel locations may then be stored as signature data rather than the capacitance changes.

In step 203, the touch device determines boundary points of the signature. The touch device may determine the leftmost, rightmost, lowest, and highest coordinates of the signature. To determine the boundary points, the touch device may first rotate the signature, e.g., by rotating the signature by one to ten degrees in a clockwise direction. For example, the touch device may determine that the signature is sloping upward. When the signature is sloping upward, the touch device may skew the signature so that the boundary points are normalized once the signature has been rotated.

Figure 5:
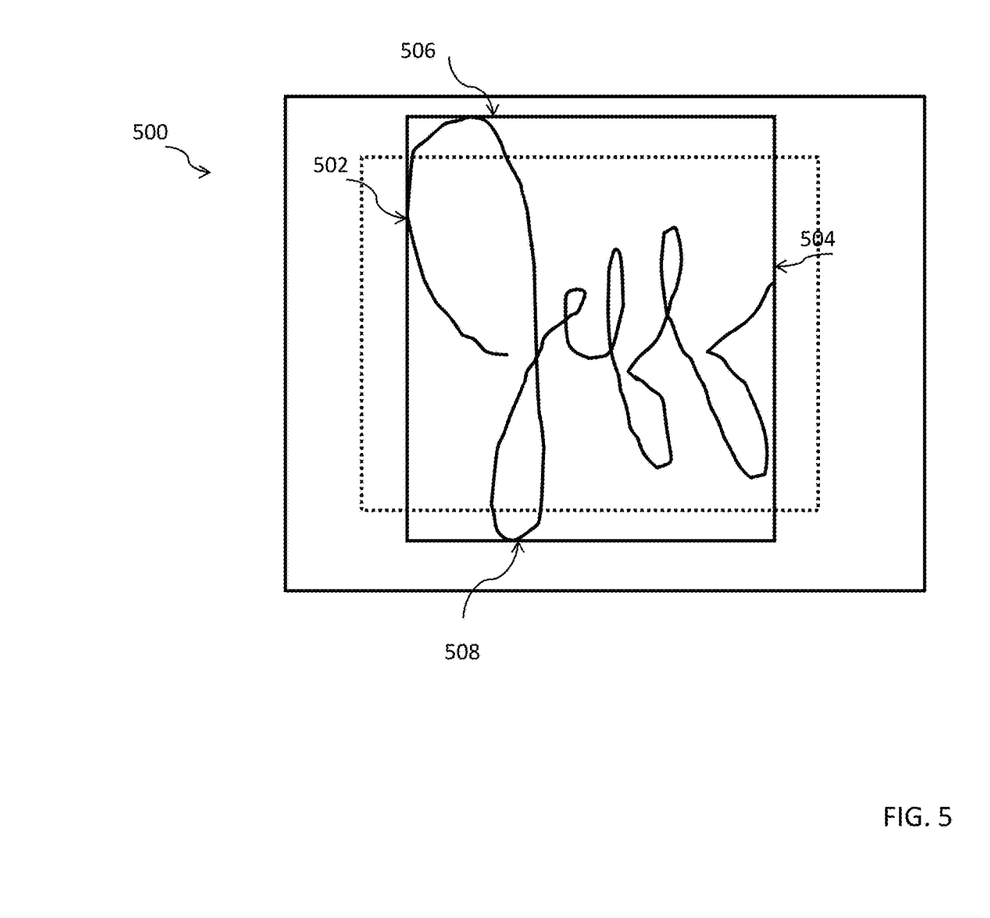
FIG. 5 illustrates determining the major coordinates, according to an embodiment.

FIG. 5 illustrates how the application may determine major boundary coordinates 500, such as leftmost 502, rightmost 504, highest 506, and lowest 508 coordinates of the signature. Because the signature may be drawn at an angle, the touch device may determine that the midpoint line (not shown) is at an angle, thereby indicating that the signature is at an angle. Before determining the major coordinates of the signature, the application on the touch device may rotate the signature so that the midpoint line is parallel to the X-axis (e.g., such that the signature is now straight across). In one embodiment, the application can correct the alignment of the signature, and the user interface prompts the user whether to accept the revised signature or to continue with the original signature orientation. On a grid, the highest point may be the point with the highest Y coordinate, and the lowest point may be the point with the lowest Y coordinate. The leftmost point may be the point with the lowest X coordinate, and the rightmost point may also be the point with the highest X coordinate.

In step 204, the application on the touch device may generate a set of points representing the curvature of the input stroke. The application may interpret the sensor or capacitance data to identify points to be used as curvature information. For example, the touch device may provide a series of touch events. The touch events may provide coordinates rounded to the nearest pixel or pixel boundary. For example, the operating system of the touch device may determine that a capacitance change occurred near a pixel at coordinates (40, 50).

The touch screen of the touch device may be configured with a grid of sensors, e.g., sensors that detect raw capacitance changes. For a set of capacitance changes, the application or touch device operating system determines which point is the center of mass. In one example, a change of capacitance may be located 30% across a pixel. However, the operating system or application software may provide a rounded estimate that the point of contact was directly on the pixel. The rounded estimates may create noise in establishing the curves of the stroke.

In tracking a user's finger movement across a screen, the touch device may experience noise due to oversampling. For example, a user's finger may move back and forth in a zigzag pattern. To reduce the noise, the touch device may use Bezier curves to define the curvature. A periodic selection of points (e.g., every third or fourth point) may be used to generate a more smooth curve. For example, every third point may be used as a data point, and the two intervening coordinates can be used as control points (non-data points) to render a Bezier curve. For example, in a series of four points, the control point serves to create a tangential bar that connects the first point to the second point (control point). Similarly, the third point in the series will serve as a control point for the fourth point. The third point will also create a tangential bar connecting the third and fourth points of the Bezier curve.

The application on the touch device may present an on-screen live preview of the smoothing while the curves are being rendered. Similarly, at the end of the signing, the user interface may present a final signature that has already been smoothed. The user interface may also present with a live replay of the signature as the user signed it.

Figure 6:
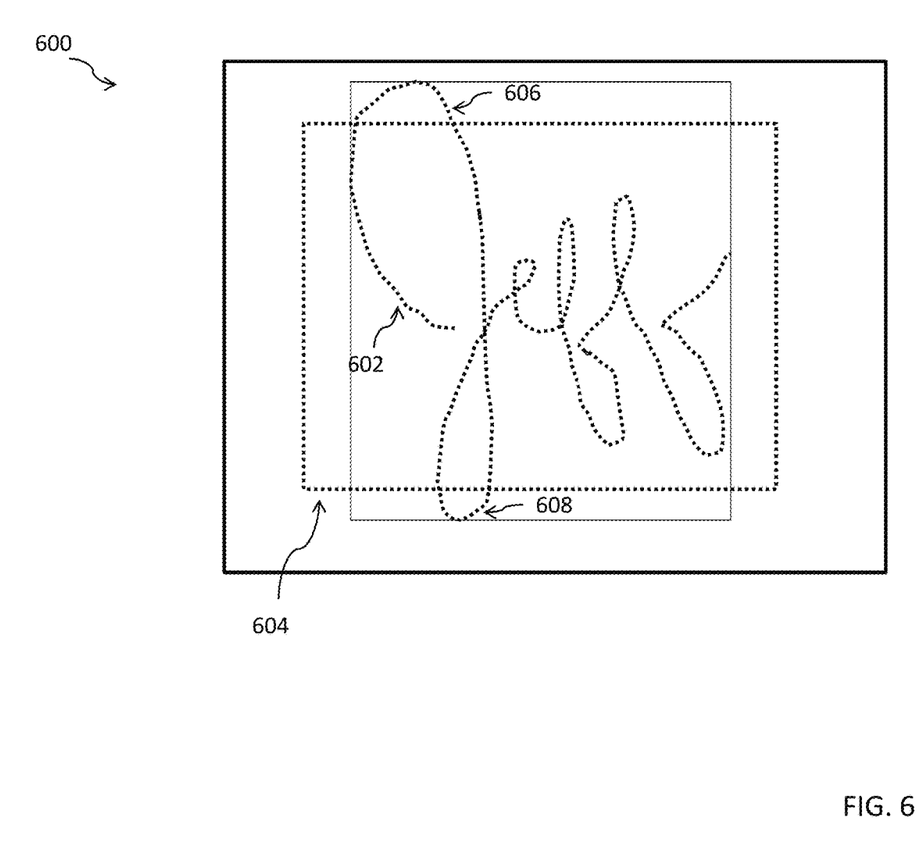
FIG. 6 illustrates generating a set of points, according to an embodiment.

FIG. 6 illustrates a generation of a set of points 600 representing the input stroke. The mobile device may map the signature data to points on a curve. The set of points 602 illustrated map the user's signature for the name "Jeff" in this example. The set of points 602 illustrated contain points (e.g., points 606, 608) drawn outside of the bounding box 604. The curve may include vector points with Bezier curves every 2, 3, or 4 points. The touch device may store the raw signature data in association with the curvature data and timestamps in a data store or transmit the data to the server for storage. Any data structure may be used for storing the data including logical memory, a binary tree, a hash, an array, or the like. The signature data may include stroke width information in addition to curvature information. For example, the stroke width may vary along the points of the curves of the signature, and this stroke width data may also be stored. In other embodiments, a fixed stroke width may be applied to each point on the curve.

In step 205, the application on the touch device may scale the set of points such that the leftmost, rightmost, lowest, and highest coordinates are maximized within a designated area representing the signature box on the payment card. For example, the touch device may specify a signature box with the same aspect ratio as the bounding box. The signature box may have a length and width specified by the manufacturer. The application may scale the set of points using any of known methods.

Figure 7:
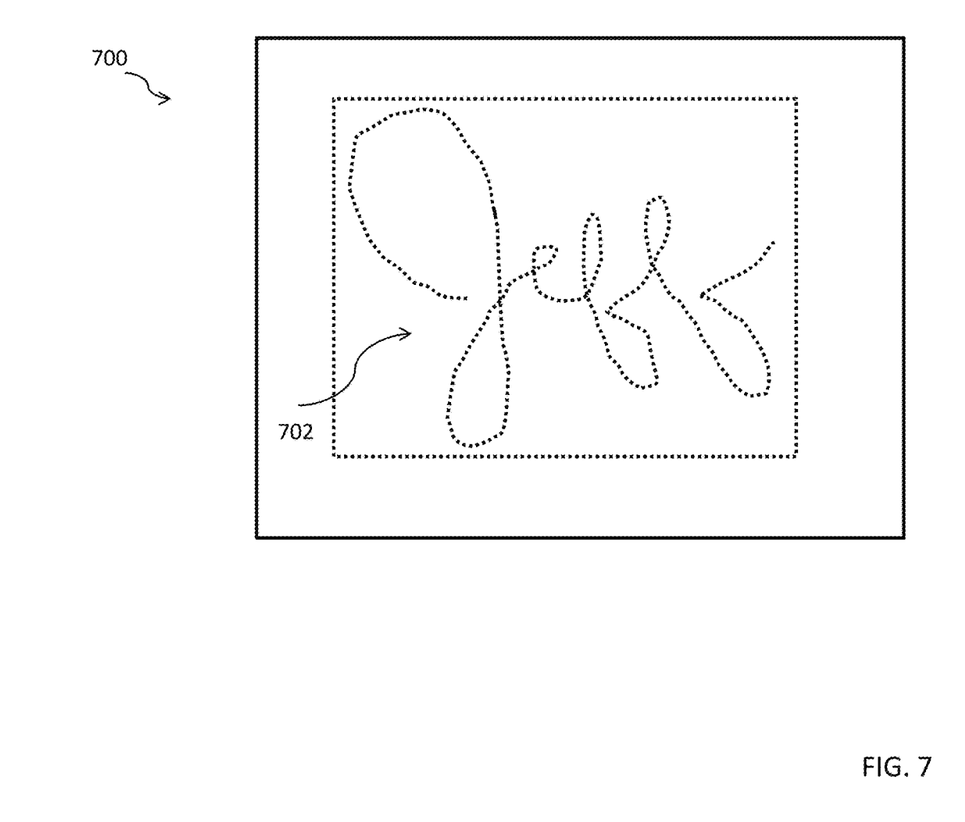
FIG. 7 illustrates scaling the set of points, according to an embodiment.

FIG. 7 illustrates how the application scales a set of points 700 and/or curvature information so that the signature is maximized within a signature box. The application may generate the user interface to illustrate the maximized signature in the signature box to the user for confirmation. In some embodiments, the user may then move or scale the signature using the user interface.

In step 206, the touch device may convert the scaled set of points from a vector format to a raster format. The raster format may be any known format such as JPEG, TIFF, GIF, BMP, PNG, etc. The touch device may transmit the raster formatted image 702 to the server, and the server may transmit the raster formatted image to the manufacturing facility.

Figure 8:
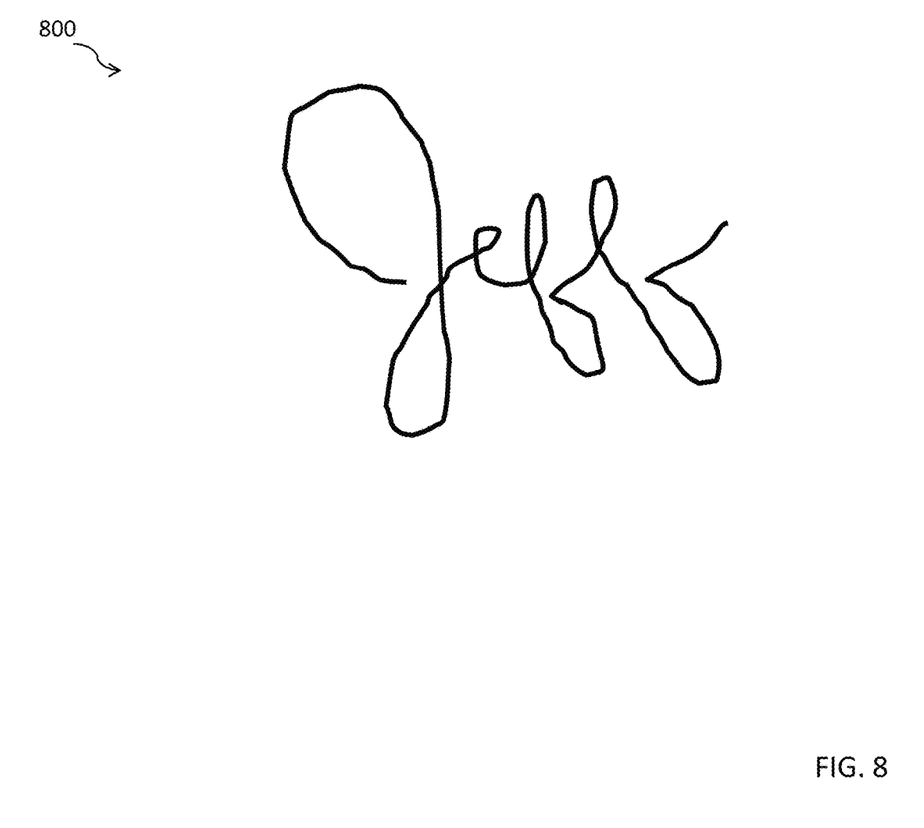
FIG. 8 illustrates raster image, according to an embodiment.

FIG. 8 illustrates how the application converts a scaled set of points to a raster image 800. The application may consider the coordinates of the signature data and the curve information when converting to a raster image. The touch device or the server can convert the points into a raster image. The application can also calculate the appropriate stroke width before converting into a raster image. After converting to a raster image, the application may present on the user interface a preview of the final signature. The final signature may be more smooth and may be resized from the touch-inputted signature.

In step 207, the manufacturer may imprint the raster image onto a payment card. The raster image may include a scaled set of points in the signature box. The manufacturer may laser etch the image or print the image on the payment card. The resolution the raster image is printed may be 500, 600, or 2000 dots per inch (DPI), for example. The manufacturer may further package and send the card directly to the user.

Figure 9:
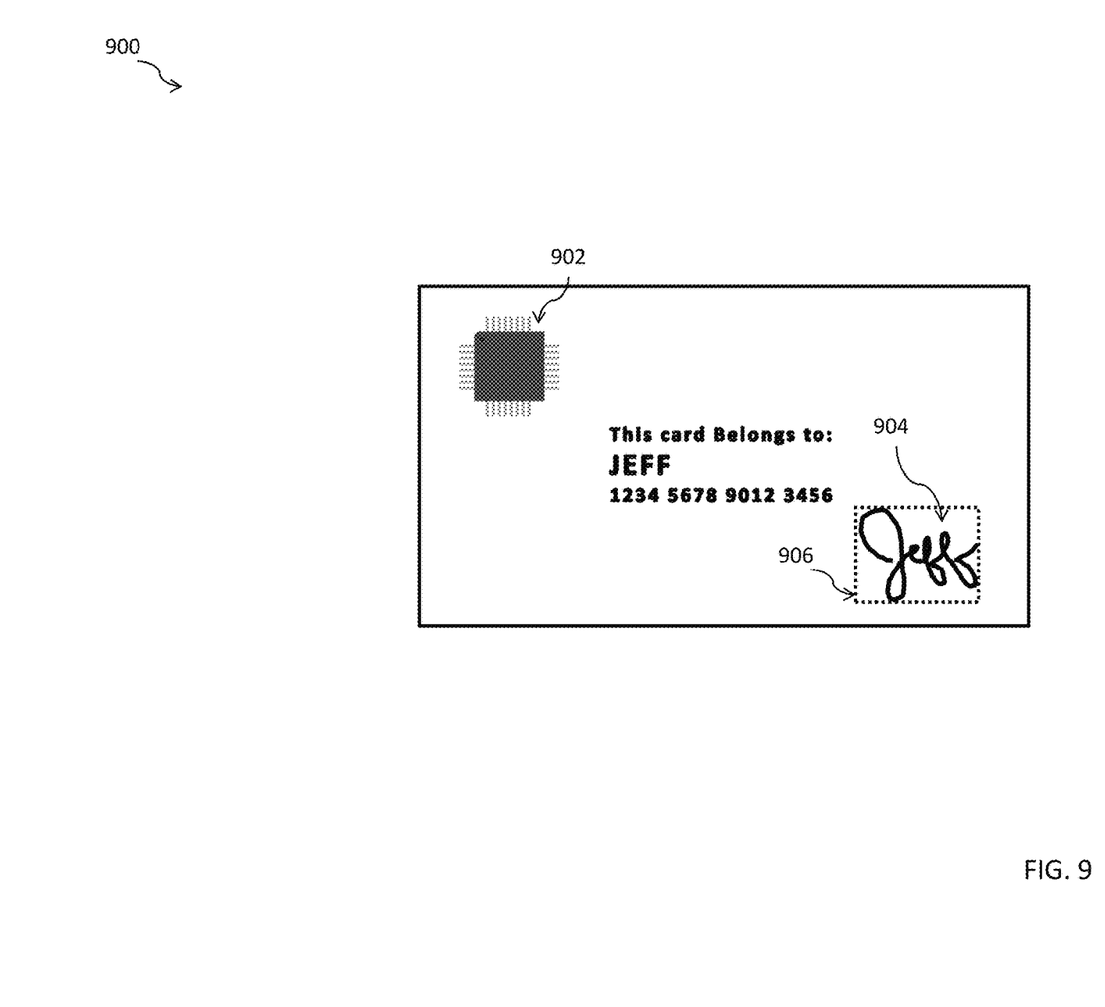
FIG. 9 illustrates an imprinted raster formatted image, according to an embodiment.

FIG. 9 illustrates a payment card having an imprinted raster formatted image 900. The manufacturer may also etch a raised version of the signature on burned plastic, for example. The laser may etch at different resolutions or DPI. For example, the signature may be etched at 500 to 2000 DPI. The resolution may be predetermined by the manufacturer or the server. Payment card 900 may include a chip 902 (e.g., an EMV chip), and the payment card 900 includes a signature 904 printed, etched, or otherwise provided in signature space 906. The signature may be printed with a line of predetermined thickness. For example, the vector curve may have a stroke applied that is consistent throughout the signature.

The manufacturer may also package and send the card to the user directly. For example, the server or touch device may send profile information to the manufacturer. The profile information may include the set of points as vector data, the user's address, name, and account information. In some embodiments, the laser or printer may be attached to a robotic arm, which may be programmed to print according to the vector data rather than the raster image. The robotic arm may use the Bezier curves, including data points and control points, for precise etching.

Figure 10:
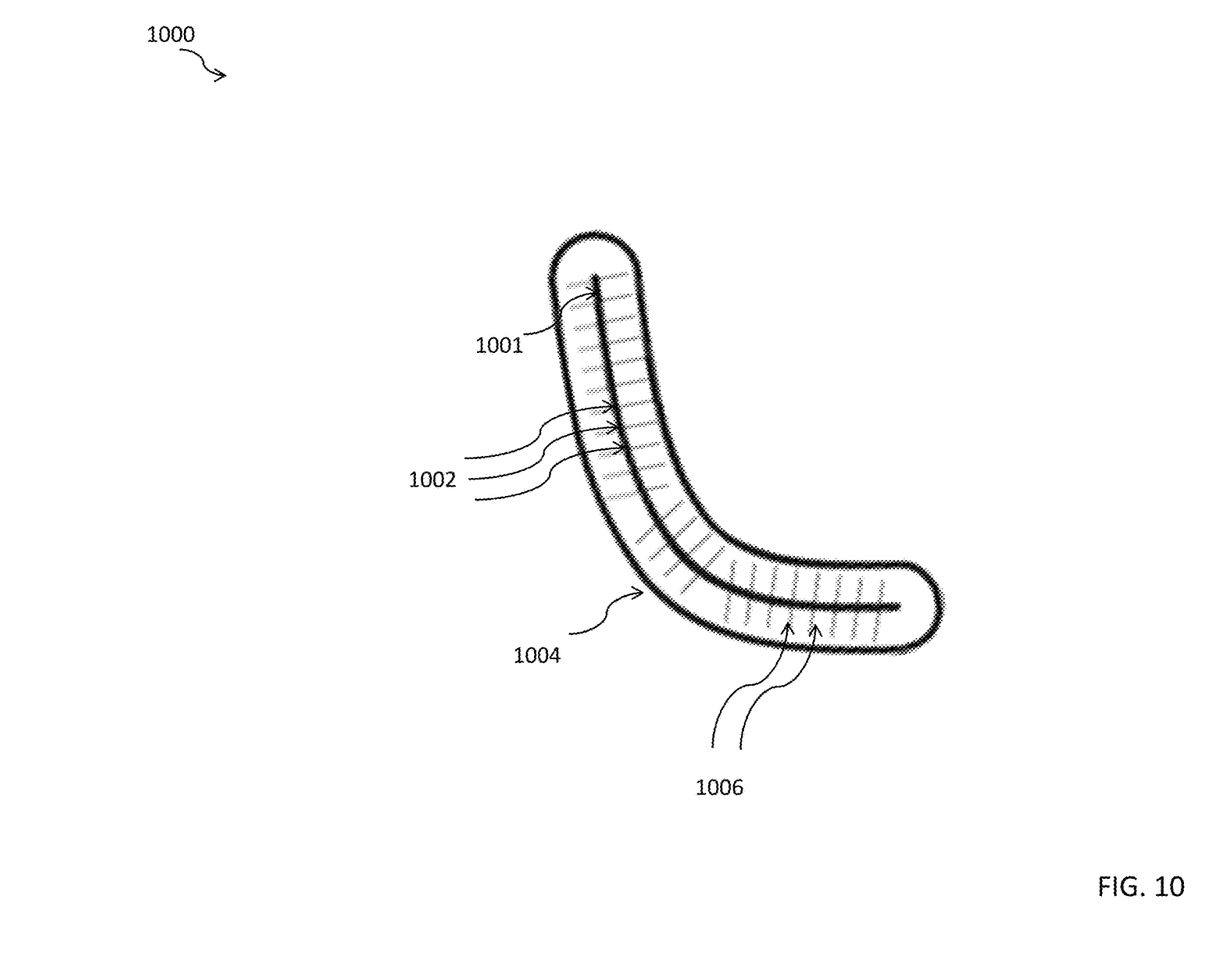
FIG. 10 illustrates a stroke width, according to an embodiment.

FIG. 10 illustrates a stroke width 1000. The stroke width 1000 may include curve 1001, set of points 1002, stroke 1004, and tangential lines 1006. The touch device may generate the signature using a consistent stroke such as stroke 1004 using a set of points described above. The application may create stroke 1004 by manipulating tangential lines 1006 to be the same width throughout curve 1001. The stroke width 1000 illustrates how a clean, consistent stroke width may be applied to the vector data points at any point of the process. Further, the stroke width may be modified so that it is made thicker, thinner, or adjustable width. In one embodiment, the payment card is printed with a signature of constant stroke width, regardless of how the signature was generated, manipulated, or resized. In another embodiment, the application may present options to the user to select different stroke width sizes, an automatic resizing, and adjustable widths.

Although certain illustrative, non-limiting embodiments have been presented, various changes, substitutions, permutations, and alterations may be made without departing from the scope of the appended claims. Further, the steps of the methods described herein may be carried out in any suitable order, or simultaneously where appropriate. Thus, the scope of the disclosure should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, may refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The embodiments may relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The embodiments described herein are described as software executed on at least one mobile device, though it is understood that embodiments may be configured in other ways and retain functionality. The embodiments may be implemented on known devices such as a personal computer, a special purpose computer, a server, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein may be used to implement the systems and techniques according to this disclosure.

The embodiments may relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

Furthermore, it should be appreciated that the various links connecting the elements may be wired or wireless links, or any combination thereof, or any other known or later developed element(s) that is capable of supplying or communicating data to and from the connected elements. The term "module" as used herein may refer to any known or later developed hardware, software, firmware, or combination thereof that is capable of performing the functionality associated with that element.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Presently preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

What is claimed is:

1. A method for generating a personalized signature of a user for a card, the method comprising:
   presenting, by a mobile device executing an application and having a touch-enabled display, a user interface having a bounding box that is specified by a width and height representative of a space on the card having a same aspect ratio;
   receiving, by the mobile device, signature data generated by an input stroke from the user at least substantially within the bounding box of the user interface;
   determining, by the mobile device, from the signature data a leftmost, rightmost, lowest, and highest coordinate of a signature represented by the input stroke;
   generating, by the mobile device, a set of points representing a curvature of the input stroke;
   scaling, by the mobile device, the set of points such that the leftmost, rightmost, lowest, and highest coordinates are maximized within the space; and
   converting, by the mobile device, the scaled set of points from a vector format to a raster format, wherein the raster formatted scaled set of points is rasterized into a line of a predetermined thickness,
   whereby the raster formatted scaled set of points in the space are configured for printing on the card.

2. The method of claim 1, wherein the generating further comprises:
   using every third point of the set of points as a data point in a Bezier curve.

3. The method of claim 2, wherein the generating further comprises:
   using every non-data point as a control point in the Bezier curve.

4. The method of claim 1, further comprising presenting, by the mobile device, the raster formatted scaled set of points on the user interface for confirmation before imprinting the raster formatted scaled set of points.

5. A method for generating a signature for a card, the method comprising:
   presenting, by a touch device, a user interface on a touch screen having a bounding box that is specified by a width and height representative of a signature space on the card;
   receiving, by the touch device, signature data generated by an input stroke on the touch screen;
   determining, by the touch device, from the signature data one or more boundary coordinates of a signature represented by the input stroke;

generating, by the touch device, a set of points representing a curvature of the input stroke;

scaling, by the touch device, the set of points such that the boundary coordinates are maximized within the space; and converting, by the touch device, the scaled set of points from a first format to a second format, wherein the scaled set of points of the second format is rasterized into a line of a predetermined thickness, whereby the scaled set of points in the second format are configured for printing on the signature space on the card.

6. The method of claim 5, wherein the signature space on the card has a same aspect ratio as the bounding box.

7. The method of claim 6, wherein the input stroke is at least substantially within the bounding box.

8. The method of claim 5, wherein the generating further comprises:

using every third point of the set of points as a data point in a Bezier curve.

9. The method of claim 8, wherein the generating further comprises:

using every non-data point as a control point in the Bezier curve.

10. The method of claim 6, further comprising rasterizing, by the touch device, the raster formatted scaled set of points into a line of a predetermined thickness.

11. A system for generating a signature for imprinting on a card comprising:

a touch device comprising memory and a processor configured to:

present a user interface on a touch screen of the touch device having a bounding box that is specified by a width and height representative of a space on the card having a same aspect ratio;

receive signature data generated by an input stroke of user at least substantially within the bounding box on the touch screen;

determine from the signature data, coordinates of a signature represented by the input stroke;

generate a set of points representing a curvature of the input stroke;

scale the set of points such that the coordinates are maximized within the space; and convert the scaled set of points from a vector format to a raster format, whereby the raster formatted scaled set of points in the space are configured for printing on the card.

12. The system of claim 11, wherein the processor is further configured to:

determine from the signature data the coordinates of a leftmost, rightmost, lowest, and highest point of the signature.

13. The system of claim 12, wherein the processor is further configured to:

scale the set of points such that the leftmost, rightmost, lowest, and highest points are maximized within the space.

14. The system of claim 11, wherein the processor is further configured to:

use every third point of the set of points as a data point in a Bezier curve.

15. The system of claim 14, wherein the processor is further configured to:

use every non-data point as a control point in the Bezier curve.

16. The system of claim 11, wherein the predetermined thickness is a consistent stroke width throughout the scaled set of points.

17. The system of claim 11, wherein a server transmits the aspect ratio to the touch device.

18. A computer-readable storage medium storing instructions that, when executed by a computing system, cause the computing system to perform operations for a method of generating a signature on a card, the operations comprising:

presenting, by the computer, a user interface on a touch screen having a bounding box that is specified by a width and height representative of a space on the card;

receiving, by the computer, signature data generated by an input stroke on the touch screen;

determining, by the computer, from the signature data a set of boundary coordinates of a signature represented by the input stroke;

generating, by the computer, a set of points representing a curvature of the input stroke;

scaling, by the computer, the set of points such that the set of boundary coordinates are maximized within the space; and converting, by the computer, the scaled set of points from a vector format to a raster format, whereby the raster formatted scaled set of points in the space are configured for printing on the card.

19. The computer-readable storage medium according to claim 18, wherein the space on the card has a same aspect ratio as the bounding box.

20. The computer-readable storage medium according to claim 18, wherein the input stroke is at least substantially within the bounding box.

21. The computer-readable storage medium according to claim 18, wherein the generating further comprises:

using every third point of the set of points as a data point in a Bezier curve.

22. The computer-readable storage medium according to claim 21, wherein the generating further comprises:

using every non-data point as a control point in the Bezier curve.

23. The computer-readable storage medium according to claim 18, wherein the raster formatted scaled set of points is rasterized into a line of a predetermined thickness.

* * * * *